United States Patent
Ohnishi et al.

(10) Patent No.: US 6,766,887 B2
(45) Date of Patent: Jul. 27, 2004

(54) DUAL MODE TYPE DRUM BRAKE DEVICE

(75) Inventors: Junichi Ohnishi, Nagoya (JP); Yoshihiro Tatsumi, Aichi-ken (JP)

(73) Assignee: Nisshinbo Ind. Inc., Tokyo (JP)

(*) Notice: Subject to any disclaimer, the term of this patent is extended or adjusted under 35 U.S.C. 154(b) by 0 days.

(21) Appl. No.: 10/361,218

(22) Filed: Feb. 10, 2003

(65) Prior Publication Data

US 2003/0150676 A1 Aug. 14, 2003

(30) Foreign Application Priority Data

Feb. 14, 2002 (JP) ........................................ 2002-036667

(51) Int. Cl.[7] ......................... F16D 51/00; F16D 51/24; F16D 51/50
(52) U.S. Cl. .................... 188/328; 188/106 F; 188/2 D
(58) Field of Search .................... 188/106 F, 106 A, 188/78, 2 D, 325, 327, 328, 329, 330, 341, 79.51, 79.54, 79.56

(56) References Cited

U.S. PATENT DOCUMENTS

| | | | |
|---|---|---|---|
| 5,275,260 A | | 1/1994 | Evans et al. |
| 6,044,938 A | * | 4/2000 | Yabusaki et al. ........ 188/106 F |
| 2002/0092714 A1 | * | 7/2002 | Asai et al. ..................... 188/78 |
| 2003/0150676 A1 | * | 8/2003 | Ohnishi et al. .......... 188/106 F |

FOREIGN PATENT DOCUMENTS

| | | |
|---|---|---|
| EP | 0800014 B1 | 10/1997 |
| EP | 0800014 A3 | 10/1997 |
| EP | 01336769 A2 * | 8/2003 |
| JP | 56-010833 A1 | 3/1981 |
| JP | 9-273573 A1 | 10/1997 |

OTHER PUBLICATIONS

Translations form STIC of submitted JP62[1987]8652 and JP9–273572A.*

* cited by examiner

Primary Examiner—Douglas C. Butler
(74) Attorney, Agent, or Firm—Apex Juris, pllc; Tracy M Heims

(57) ABSTRACT

A brake cable for a dual mode type drum brake functioning as a leading-trailing type during the service brake and as a duo-servo type during the parking brake, may be easily arranged at a lower side of axle. The first and second brake levers (118), (119) of a parking brake actuator (117) have proximal portions (118a), (119a) pivotally supported between two ends of a second brake shoe (3) and at a lower end thereof; free ends (118b), (119b) extend in opposed direction from the proximal portions (118a), (119a) in parallel to face and functionally engage each other; a strut (120) extends between the second brake lever (119) and the pivot lever (16); and a brake cable (23) pulled to activate the free end (118b) is arranged adjacent to the anchor (7).

4 Claims, 8 Drawing Sheets mode type drum brake device during the parking brake operation.

DUAL MODE TYPE DRUM BRAKE DEVICE

BACKGROUND OF THE INVENTION

1. Field of the Invention

This invention relates to a drum brake device and more specifically to a dual mode type drum brake which functions as a leading-trailing (LT) type brake device during the service brake operation and functions as a duo servo (DS) type brake device during the parking brake operation.

2. Description of Related Art

Related art dual mode type drum brake devices are, for example, disclosed in U.S. Pat. No. 5,275,260, Japanese patent publication number 62-8652 (AU-B1-53 491/79 for English) and Japanese provisional patent publication number 9-273573 (U.S. Pat. No. 6,003,645 for English).

General structures of the Related art dual mode type drum brake devices are disclosed in the aforementioned publications and therefore the explanation of which is set forth in an example to be explained hereunder with reference to FIGS. 6 and 7.

A back plate 1 has a central hole 1a freely fitting over an axle of a vehicle, and four bolts, not shown in the figures, are inserted through four bolt holes 1b for a purpose of fixing the same on a stationary portion of the vehicle.

A pair of facing first and second brake shoes 2 and 3 is provided, each makes a T-shape in cross-section as a shoe rim 2a is formed together with a shoe web 2b while a shoe rim 3a is formed together with a shoe web 3b, and linings 2c and 3c are adhered on peripheral surfaces of the shoe rims 2a and 3a respectively.

The brake shoes 2 and 3 are movably mounted on the back plate 1 by conventional shoe-hold mechanisms 4 and 5, each composed of a plate spring and a pin.

In FIG. 6, a wheel cylinder 6 functioning as a service brake actuator is arranged between adjacent upper ends 2d and 3d of the brake shoes 2 and 3, which is fixed on the back plate 1.

An anchor block 7 is arranged between adjacent lower ends 2e and 3e of the brake shoes 2 and 3, which is fixed on a protrusion of the back plate 1 by two rivets 8 and 8.

An extensible shoe clearance adjustment device 9 composed of an adjustment bolt 10, an adjustment nut 11 and a socket 12, extends between the pair of brake shoes 2 and 3.

Tools such as a screwdriver may be inserted from an insertion hole 1c (FIG. 7) formed on the back plate 1 or a hole formed on a brake drum, not shown in the figures; and adjustment teeth 10a formed on the adjustment bolt 10 are manually rotated to screw the adjustment bolt 10 in or out from the adjustment nut 11 so as to adjust the shoe clearance.

Although FIGS. 6 and 7 disclose an automatic shoe clearance adjustment mechanism composed of an adjustment lever 13, an adjustment spring 14 and a pin 15, the explanation of which is limited to an anti-vibratory function to the pivot lever 16 and the parking brake actuator 17.

The pivot lever 16 is constantly urged to be clockwise, via the pin 15 which also pivotally supports the adjustment lever 13 and is integrated with the pivot lever 16, due to a spring force of the adjustment spring 14, thereby suppressing the vibration of the pivot lever 16 and the parking brake actuator 17.

A central region of the pivot lever 16 or a portion of the pivot lever 16 between an abutment point with the shoe clearance adjustment device 9 and an abutment point with a later described strut 20 in FIG. 6 is pivotally supported on the first brake shoe 2 around a pivot section 16c. An upper end 16a and a lower end 16b of the pivot lever 16 respectively make a functional engagement with the shoe clearance adjustment device 9 and the strut 20.

A parking brake actuator 17 composed of a brake lever 18, the strut 20 and a pin 21 is provided adjacent to the anchor block 7.

The brake lever 18 is designed such that the proximal portion 18a of the brake lever 18 is pivotally supported on the second brake shoe 3 around the pin 21 adjacent to the anchor block 7. A cable end 23a on the tip of the brake cable 23 arranged through a guide pipe 26 fixed on the back plate 1 is hooked and rested on a free end 18b of the brake lever 18 at the wheel cylinder 6 side.

The strut 20 extends between a portion on the brake lever 18 adjacent to the proximal portion 18a and the lower end 16b of the pivot lever 16.

Further, a shoe return spring 24 is stretched between the upper ends of the brake shoes 2 and 3 while a shoe return spring 25 is stretched between the lower ends of the brake shoes 2 and 3, urging the brake shoes 2 and 3 to approach each other, and upper facing portions of the brake shoes 2 and 3 engage and abut against the shoe clearance adjustment device 9 while lower facing ends 2e and 3e engage and abut against the anchor block 7.

Brake operation of the above-described structure will be explained next.

First, a service brake operation will be explained.

If a brake pedal, not shown in the figures, is stepped on to pressurize the wheel cylinder 6, the adjacent upper ends 2d and 3d of the brake shoes 2 and 3 are pressed to spread apart from each other pivoting with abutment points between the adjacent lower ends 2e and 3e and the anchor block 7, and the linings 2c and 3c frictionally engage with the brake drum, not shown in the figures, thereby generating a rotating braking force and functioning as a leading-trailing type drum brake.

Next, a parking brake operation will be explained.

A hand lever, not shown in the figures, is operated to pull the brake cable 23 toward the first brake shoe 2 side, and the brake lever 18 rotates clockwise in FIG. 6 around the pin 21 to press the strut 20. The pressing force on the strut 20 rotates the pivot lever 16 counterclockwise around the pivot section 16c spreading the second brake shoe 3 open via the shoe clearance adjustment device 9. The pivot lever 16 rotates counterclockwise with an abutment point between the pivot lever 16 and the shoe clearance adjustment device 9, thereby spreading the first brake shoe 2 open due to the pressing force acting on the pivot section 16c of the pivot lever 16.

A reaction force of the brake lever 18 acts on the lower end 3e of the second brake shoe 3 via the pin 21 with abutment point between the brake lever 18 and the strut 20.

Accordingly, linings 2c and 3c of both brake shoes 2 and 3 frictionally engage with the brake drum, not shown in the figures, thereby keeping the stationary state of the brake drum.

A frictional force of a primary brake shoe 2 or 3, being caused by a rotational direction of the brake drum, is transmitted to the remaining secondary brake shoe 3 or 2 via the shoe clearance adjustment device 9, thereby functioning as a duo servo type drum brake.

The above-described related art dual mode type drum brakes have the following drawbacks:

FIG. 8 is an example of a part of chassis at a rear side of the vehicle.

FIG. 8 illustrates drum brakes a and a attached on two-end side surfaces of an axle housing b. In FIG. 8, the left drum brake a only describes a back plate 1 and a wheel cylinder 6 and a right drum brake, explained in FIGS. 6 and 7, only describes a back plate 1. Each wheel cylinder 6, only one of which is illustrated in the left drum brake in FIG. 8, is generally positioned at an upper central portion of the back plates 1, 1 in order to avoid damaging a brake pipe and brake hoses c, c in case of a fallen wheel in a gutter, flying gravel, or the like.

In the above-described related art dual mode type drum brake, the brake cable 23 is arranged adjacent to the wheel cylinder 6 and extended toward a front side of the vehicle through the guide pipe 26.

Shock absorbers d and d and coil springs e and e existing at a front side of the vehicle become obstacles for a routing design of the brake cable 23.

OBJECT AND SUMMARY OF THE INVENTION

This invention was made to improve the above-points and is to provide a dual mode type drum brake with an improvement in a simple structure of a parking brake actuator, in which a brake cable can be arranged in a lower side of a drum brake relative to an axle, thereby not being interrupted by any chassis parts.

In order to achieve the above-described objectives, this invention provides a dual mode drum brake wherein a parking brake actuator is designed such that a first brake lever has a proximal portion pivotally supported on a portion between both ends of a second brake shoe and a second brake lever has a proximal portion pivotally supported on a lower end portion of the second brake shoe. A free end of the first brake lever and a free end of the second brake lever extend so as to be substantially parallel and facing each other. The free end of the second brake lever functionally engages with the first brake lever between the proximal portion and the free end of the first brake lever. A strut extends between the second brake lever at a portion between the two ends thereof and the lower end side of the pivot lever; and a brake cable to be pulled to activate the free end of the first brake lever is arranged adjacent to the anchor and extended toward the first brake shoe side.

The dual mode drum brake of this invention may be designed such that the second brake lever is composed of one mono-plate, the proximal portion thereof is formed into two parallel facing forked legs to put the shoe web of the second brake shoe therebetween and a section thereof from an intermediate portion adjacent to an inner circumference of the shoe web to the free end thereof makes an almost C-shape in cross-section.

Then, an external surface of a bottom portion or an internal surface of a bottom portion of the C-shaped section functionally engages with the first brake lever.

According to the above-structured dual mode type drum brake device, a position on the back plate, from which the brake cable pulling the first brake lever is penetrated, is located at an anchor side. In other words, a position on the back plate, from which the brake cable is arranged to pass through, is located at a lower side of the axle. Therefore, no chassis parts become obstacles when routing the brake cable.

Both the first and the second brake levers may be simply integrally-formed by pressing, and the proximal portion of the second brake lever formed into forked legs putting a shoe web therebetween increases the strength against a biasing force generated due to an operation force of the first brake lever. At the same time, the operation force is transmitted to the strut without being biased.

Further, a lever-ratio of the brake lever is a value obtained by multiplying lever-ratios of the first brake lever and the second brake lever, which allows a low lever-ratio of each brake lever and enables a design of the brake levers to be thinner and lighter.

BRIEF DESCRIPTION OF THE DRAWINGS

The above and other objects and the attendant advantages of the present invention will become readily apparent by reference to the following detailed description when considered in conjunction with the accompanying drawings.

PREFERRED EMBODIMENTS OF THE INVENTION

Figure 1:
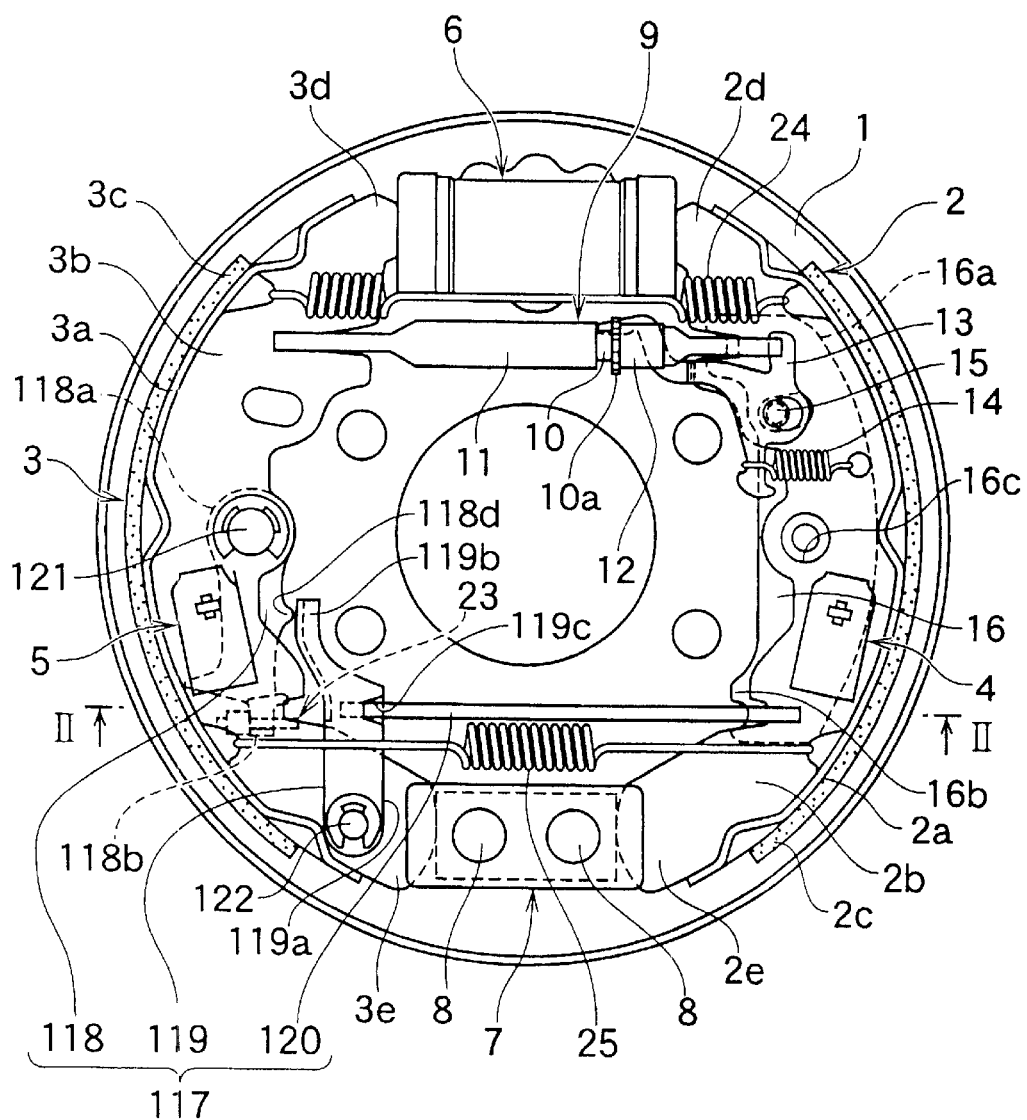
FIG. 1 is a front view of the dual mode type drum brake in accordance with Example 1 of this invention.

Example 1 of this invention will be explained with reference to FIGS. 1 to 3.

For explanation purposes, the same reference numbers as in the previous section describing the related art dual mode type drum brake device will be assigned to identical parts or sites having the same functions as described in Example 1, the explanation of which will be omitted here. The explanation will be focused on the structure of parking brake actuator 117 resolving the problems raised by the conventional arts, which are identified with reference numbers in the 100 series.

A parking brake actuator 117 of this example comprises a first brake lever 118, a second brake lever 119 and a strut 120 and so on.

The first brake lever 118 has a proximal portion 118a which is pivotally supported around a pin 121 between both ends of a second brake shoe 3 while the second brake lever 119 has a proximal portion 119a which is pivotally supported around a pin 122 at a lower end portion 3e of the second brake shoe 3.

Free ends 118b and 119b of the brake levers 118 and 119 extend so as to be parallel and facing each other, and the second brake lever 119 is arranged in parallel to the first brake lever 118 at the brake inner side.

Figure 2:
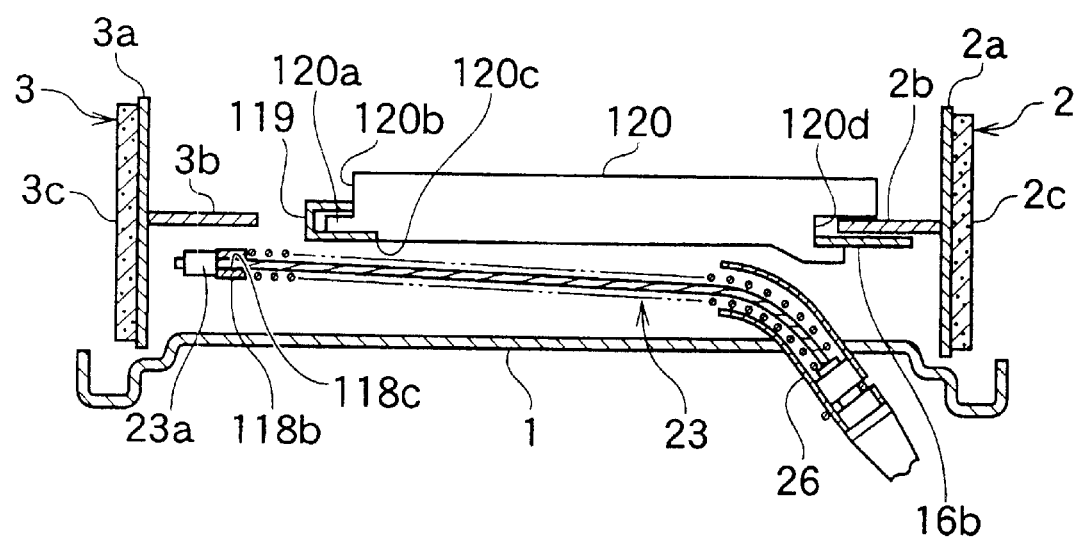
FIG. 2 is a cross-section view of FIG. 1 taken along the line II—II.
Figure 3:
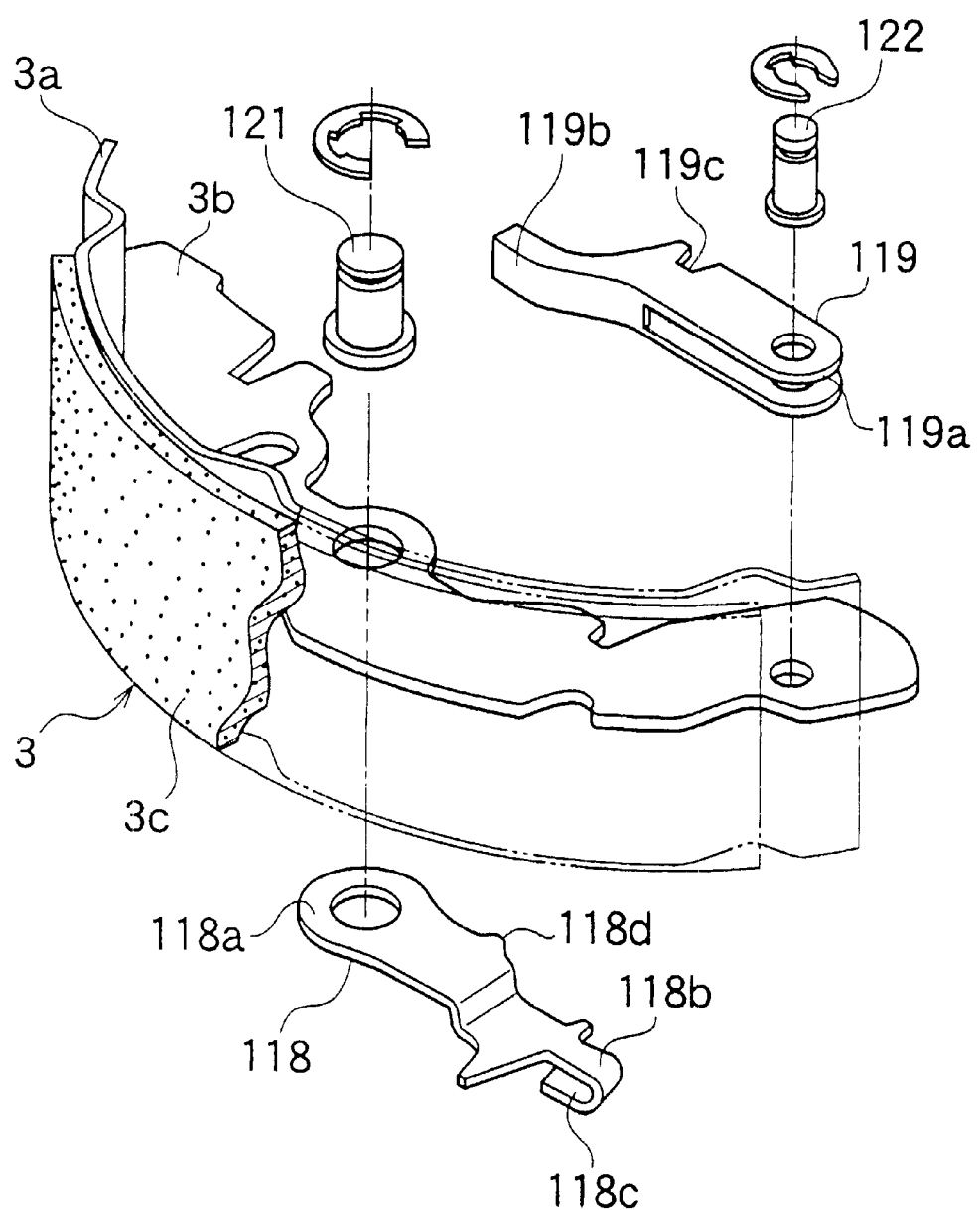
FIG. 3 is an exploded pictorial view of FIG. 1 at the second brake shoe side.

The first brake lever 118 is composed of a mono-plate, which is superposed on a shoe web 3b at a back plate 1 side and has the free end 118b bent and formed in almost U-shape with a groove 118c (see FIGS. 2 and 3).

The second brake lever 119 is also composed of a mono-plate, in which the proximal portion 119a thereof is formed into two parallel facing forked legs to put the shoe web 3b of the second brake shoe 3 therebetween (see FIG. 3). The second brake lever 119 is formed almost C-shape in cross-section between an intermediate portion thereof adjacent to an inner circumference of the shoe web 3b and the free end thereof.

An external surface of a bottom portion of the C-shaped section at the free end 119b functionally abuts and engages with a projection 118d formed between proximal portion 118a and free end 118b of the first brake lever 118, and a left end of the strut 120 functionally abuts and engages with the second brake lever 119 between proximal portion 119a and free end 119b.

In FIG. 2, the strut 120 made of a rectangular thin plate has a projection 120a at a left end thereof fitting in the C-shaped section formed on the second brake lever 119 restricting a vertical movement thereof; an upper stepped surface 120b abuts and engages with a bottom of a notched groove 119c formed on an upper leg of the two forked legs of the C-shaped section restricting a horizontal movement thereof. Further, the notched groove 119c of the second brake lever 119 is tapered to gradually internally open so as to swing in a vertical direction in FIG. 1.

A lower stepped surface 120c of the strut 120 abuts and engages with a lower leg of the c-shaped section of the second brake lever 119.

The right end portion of the strut 120 has a notched groove 120d and the bottom thereof abuts and engages with the lower end 16b of the pivot lever 16.

The strength of the free end 119b of the second brake lever 119 may be increased if an opening of the C-shaped section of the second brake lever 119 as shown in FIG. 1 is shaped to draw and to gradually externally close.

A brake cable 23, where a cable end 23a is hooked and rested on an end surface of the groove 118c of the first brake lever 118 at a shoe rim 3a side, is arranged adjacent to an anchor block 7 to extend toward the first brake shoe 2 side and passes through a guide pipe 26 to reach outside of the brake, thereby avoiding an arrangement to be obstructed by any chassis parts.

Parking brake operation of the above-described structure will be explained next.

In FIG. 1, when the brake cable 23 is activated to pull the free end 118b of the first brake lever 118, the first brake lever 118 rotates counterclockwise around the pin 121 to push the free end 119b of the second brake lever 119 via the projection 118d.

This pressing force rotates the second brake lever 119 clockwise around the pin 122 and forces the strut 120, the pivot lever 16 and the shoe clearance adjustment device 9 in this sequential order.

A reaction force of the second brake lever 119 rotates to press the lower end 3e of the second brake shoe 3 via the pin 122 with the abutment point between the second brake lever 119 and the strut 120.

The parking brake operation process hereinafter would be identical to the above-described related art parking brake operation, and therefore the explanation of which will be omitted.

Figure 4:
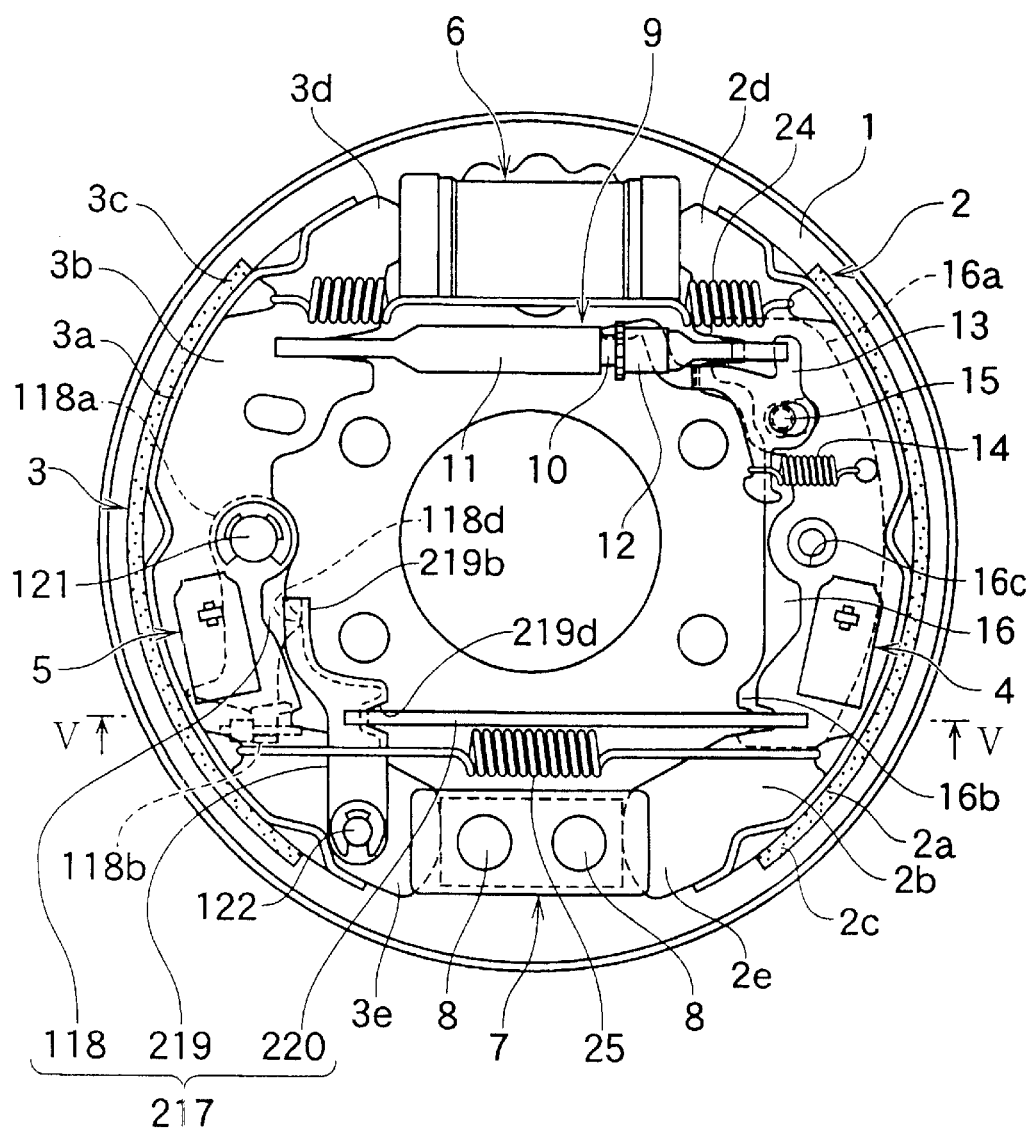
FIG. 4 is a front view of the dual mode type drum brake in accordance with Example 2 of this invention.
Figure 5:
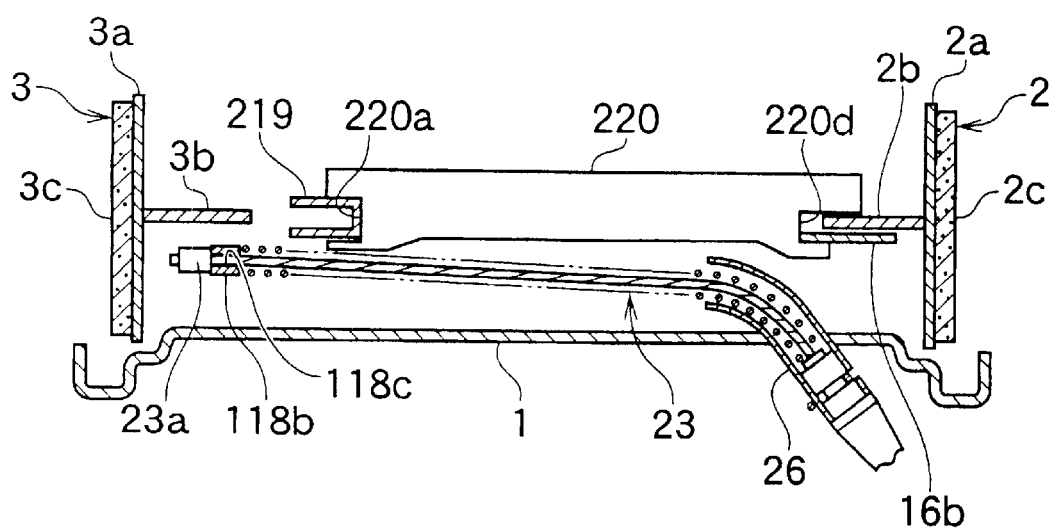
FIG. 5 is a cross-section view of FIG. 4 taken along the line V—V.
Figure 6:
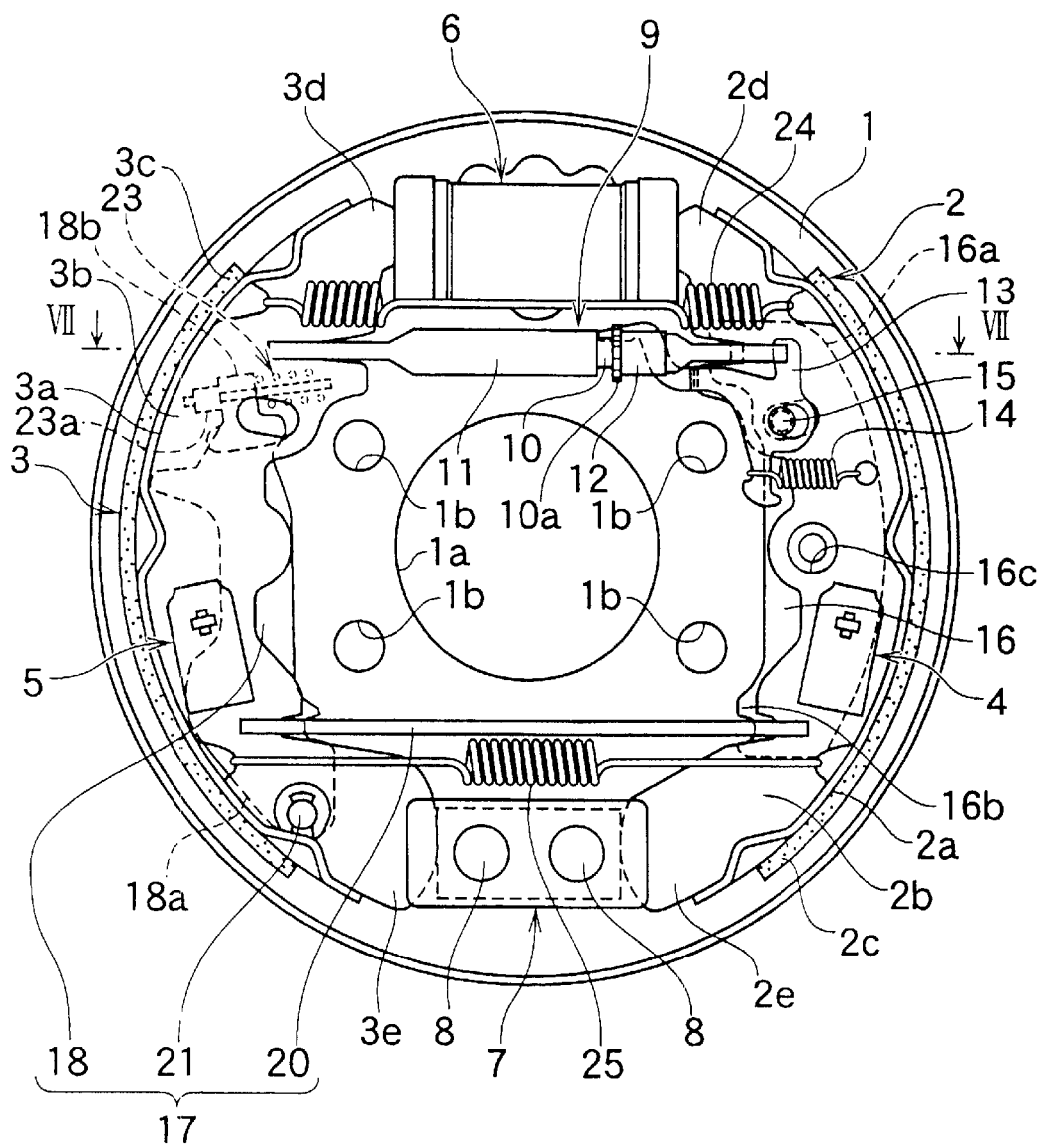
FIG. 6 is a front view of the conventional dual mode type drum brake.
Figure 7:
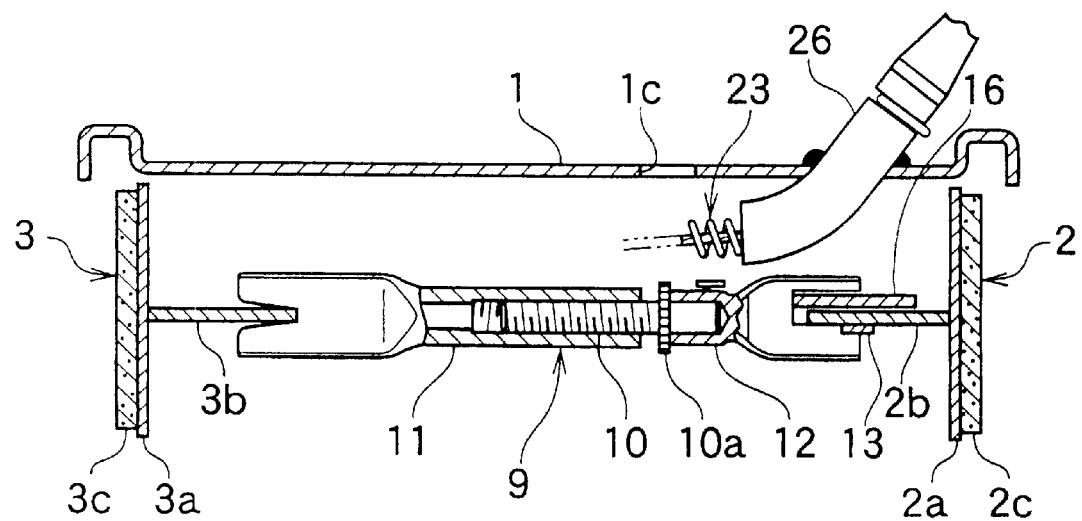
FIG. 7 is a cross-section view of FIG. 6 taken along the line VII—VII.
Figure 8:
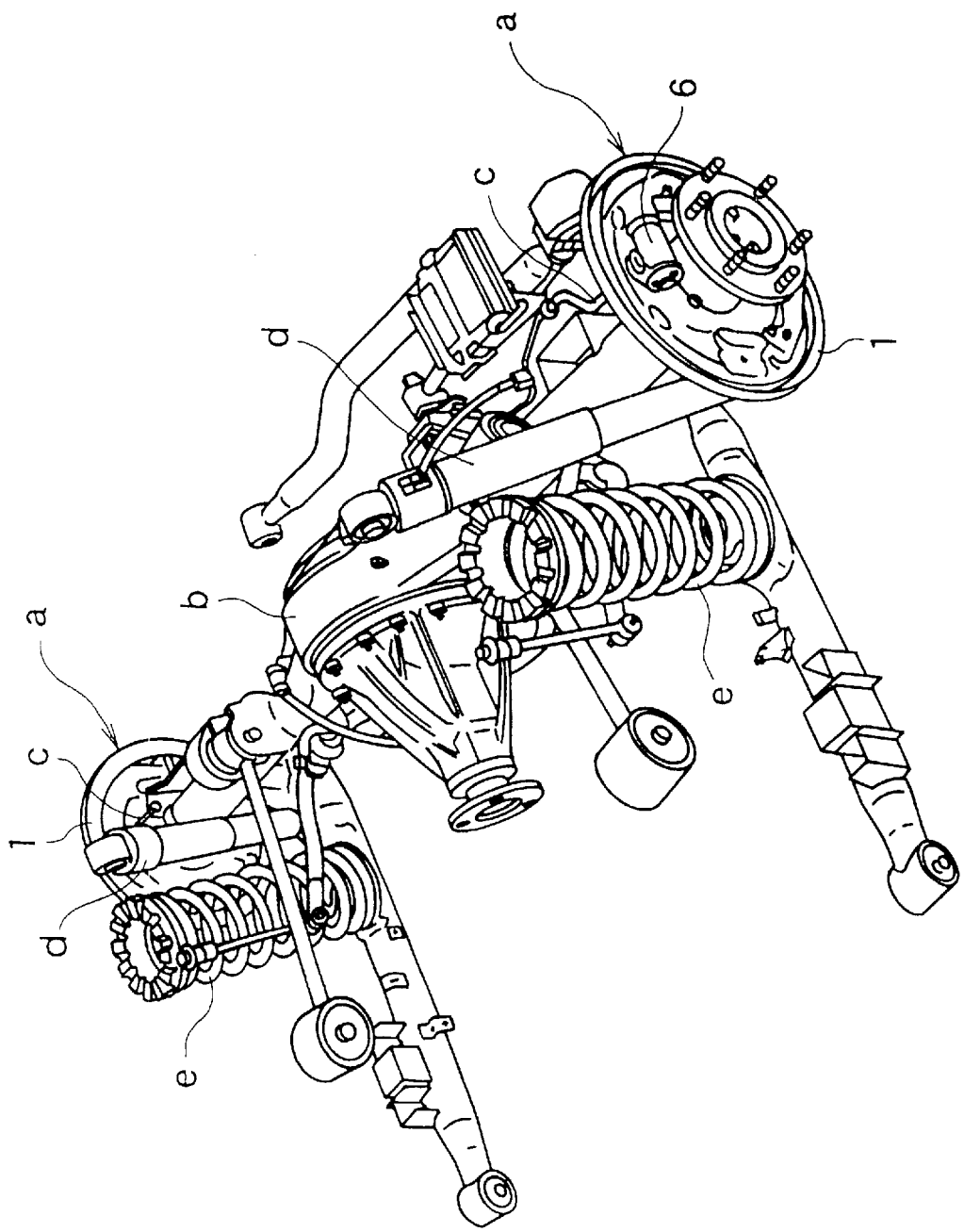
FIG. 8 is a pictorial view of an example of the platform at a rear side of the vehicle.

Example 2 of this invention will be explained with reference to FIGS. 4 and 5.

A parking brake actuator 217 of this example is identical to the above-described example 1 except for shapes of a second brake lever 119 and a strut 120, which are identified with reference numbers in 200 series.

A second brake lever 219 as compared with Example 1 is bent to form a C-shaped section in cross-section from an intermediate portion adjacent to an inner circumference edge of the shoe web 3b to the free end 219b thereof, which has an opening facing outside of the brake. A projection 118d of the first brake lever 118 functionally abuts and engages with an internal surface of a bottom of the C-shaped section of the free end 219b.

A strut 220 made of a rectangular thin plate has a notched groove 220a at the left end which crosses and functionally abuts to engage with a tapered groove or tapered notched groove 219d formed at the C-shaped section of the second brake lever 219.

The above-identified structures have the advantages of increasing the torsional rigidity of the first brake lever 118 during the parking brake operation and in obtaining more space around a central region of the drum brake.

Because of the above-described structure, this invention has the following advantages.

The dual mode drum brake of this invention comprises a parking brake actuator consisting of a first and second brake levers instead of the single brake lever of the conventional arts, thereby enabling pulling the brake cable out from a lower side of the axle and facilitating a root of the same without obstacles such as chassis parts.

A route of the brake cable may be moved from a wheel cylinder side to an anchor side simply by changing the mounting positions of the brake lever and the strut and the arrangement of the guide pipe on the back plate, which improves the designability.

Two parallel forked legs at the proximal portion of the second brake lever puts the shoe web therebetween, and the operation force of the first brake lever may be transmitted to the strut without being biased, which improves the strength of the parking brake actuator.

In case that the projection of the first brake lever fits in and functionally engages with the internal surface of the bottom of the C shaped section formed at the free end of the second brake lever, more space around the central region of the drum brake may be obtained, which makes the brake layout easier.

Further, the lever-ratio of the brake lever comes in a value obtained by multiplying the lever-ratios of the first and the second brake levers, which results in a low lever-ratio of each brake lever and enables the design of brake levers that are thinner and lighter.

It is readily apparent that the above-described invention is advantageous for use in wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What we claim is:

1. A dual mode type drum brake device comprising:
   first and second brake shoes facing each other and mounted on a back plate;
   a service brake actuator positioned between adjacent upper ends of the first and second brake shoes;
   an anchor positioned between adjacent lower ends of the first and second brake shoes;
   a shoe clearance adjustment device extended between the first and second brake shoes adjacent to the service brake actuator;

a parking brake actuator positioned adjacent to the anchor;

and a pivot lever pivotally mounted on the first brake shoe, an upper side and a lower side of the pivot lever engage with the shoe clearance adjustment device and the parking brake actuator respectively, wherein the parking brake actuator comprises a first brake lever, second brake lever and strut, the first brake lever has a first proximal portion pivotally supported on a portion between both ends of the second brake shoe;

the second brake lever has a second proximal portion pivotally supported on a lower end portion of the second brake shoe;

a first free end of the first brake lever and a second free end of the second brake lever extend so as to be substantially parallel and facing each other;

the second free end of the second brake lever functionally engages with the first brake lever between the first proximal portion and the first free end thereof;

the strut extends between the second brake lever at a portion between two ends thereof and the lower side of the pivot lever;

and a brake cable to be pulled to activate the first free end of the first brake lever is arranged adjacent to the anchor and extended toward the first brake shoe side.

2. The dual mode type drum brake device as claimed in claim 1, wherein the second brake lever is composed of one mono-plate, the second proximal portion thereof is formed into two parallel facing forked legs to put the shoe web of the second brake shoe therebetween and a section thereof from an intermediate portion adjacent to an inner circumference edge of the shoe web to the second free end thereof is formed an almost C-shape in cross-section.

3. The dual mode type drum brake as claimed in claim 2, wherein an external surface of a bottom portion of the C-shaped section of the second brake shoe functionally engages with the first brake lever.

4. The dual mode type drum brake as claimed in claim 2, wherein an internal surface of a bottom portion of the C-shaped section of the second brake shoe functionally engages with the first brake lever.

* * * * *